Patented May 31, 1927.

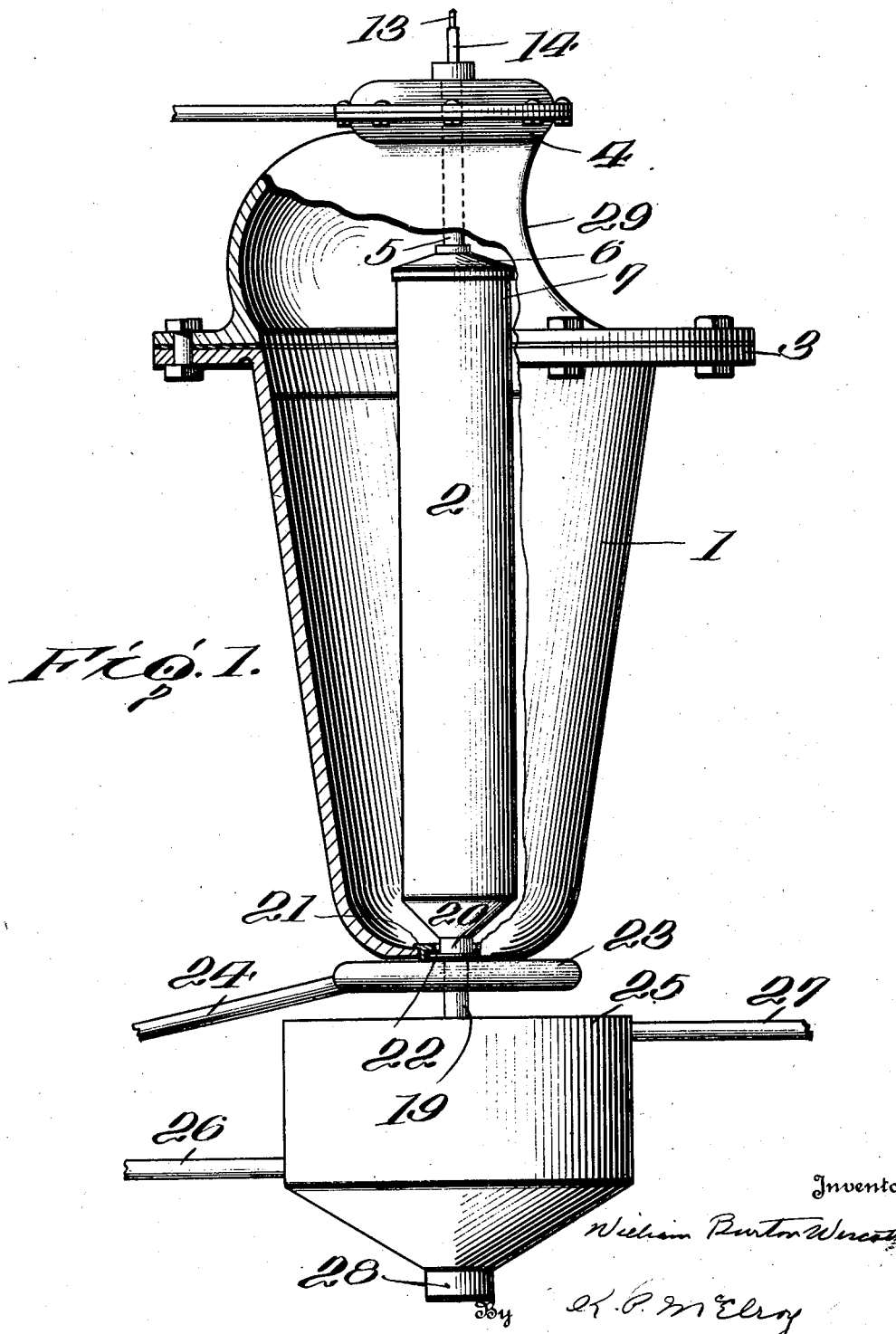

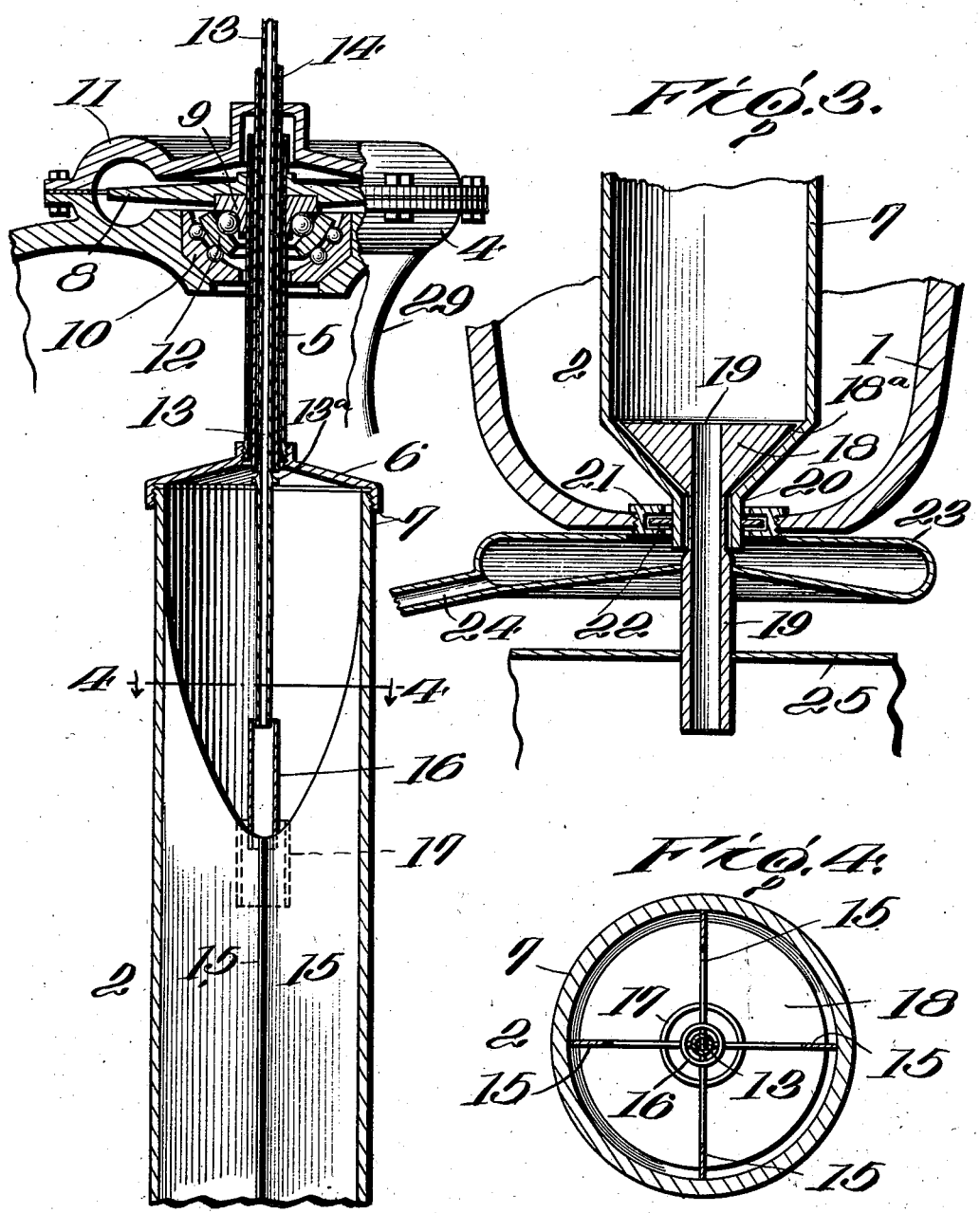

1,630,411

UNITED STATES PATENT OFFICE.

WILLIAM BURTON WESCOTT, OF DOVER, MASSACHUSETTS.

PROCESS OF TREATING LATEX AND PRODUCT THEREOF.

Application filed June 27, 1925. Serial No. 40,118.

This invention relates to processes of treating latex and products thereof: and it comprises a method wherein latex is introduced into a rapidly rotating centrifugal machine in such manner as to pick up speed without any great agitation and to form a "wall" of concentrated emulsion, such wall being then usually washed more or less completely with liquid containing an alkali or a protective colloid so as to remove, more or less completely, the natural water soluble bodies, and is then discharged with avoidance of agitation which might produce coagulation, the discharge being collected in sprayed form in an evaporating chamber; and it also comprises as a new article sprayed gelled caoutchouc latex to a substantial extent free of natural latex solubles; all as more fully hereinafter set forth and as claimed.

Latex, for the present purposes, is the milky juices of the Hevea and of other plants yielding caoutchouc. It is a complex liquid containing in addition to the finely dispersed or "emulsified" particles which yield caoutchouc, a variety of other materials in solution and suspension. Among the former are various carbohydrates (sugars), amides and proteids which render the liquid fermentable or putrescible. There are also certain enzymen capable of producing changes without bacterial activity; some of these being oxydases or laccases. One of the known constituents is quebrachitol which is thought to be a hydroxy derivative of hexamethylene. The principal dispersed or suspended constituent is that which, upon coagulation, yields ordinary caoutchouc or raw rubber. Whether, as it exists in the latex, it can be properly called caoutchouc is an undetermined question, but it is convenient to use the name. In the latex, the caoutchouc is in such a state of dispersion that the liquid presents none of the properties of ordinary rubber preparations; it is easily diffusible and filtrable, entering and passing through capilliaries. The caoutchouc in the solved state in which it exists in the latex has none of the outstanding properties of rubber solutions made with rubber, benzol and the like. On violent agitation or on the addition of various chemical bodies (acids, creosote, etc.), the caoutchouc constituent comes out as a coagulum; a material of a certain reticulate structure and rather particular properties. This coagulum, which is raw rubber, has a sort of gristly toughness. It is not as extensible as the ordinary milled rubber prepared from it, but is tougher. In practice, latex is coagulated by acidulation and the coagulum sheeted and "washed" on rolls, forming the ordinary crepe or plantation rubber. Washing is effected by passing the rubber between serrated rolls and exposing it to a stream of water. In coagulation, most of the dissolved matters of the latex are excluded; remaining with the serum or mother liquor. In order to minimize washing, it is customary to dilute the latex before coagulation.

All changes that occur in the latex by reason of fermentation or bacterial activity or because of the action of enzymes are reflected in the properties of the coagulum or raw rubber. The length of time required for coagulation and the character of the coagulum obtained depend considerably upon the previous history of the latex. One of the annoying changes which takes place is a darkening, probably due to oxydases and taking place in the parts of the rubber exposed to air.

For nearly all uses the raw or crepe plantation rubber is plasticized or milled on roll which tear it up and homogenize it, the original recticulate structure disappearing. Milled or plasticized rubber has properties in many ways different from those of the raw rubber.

Latex can be preserved against coagulation, but not against other changes, by the addition of ammonia or other alkali; and various antiseptics can be used to restrain bacterial activity.

Latex, either in the fresh state or after preservation with ammonia or antiseptics, can be dried down to form a gel; this gel containing of course all the solubles of the latex but not possessing the reticulate structure or ordinary coagulated rubber. Such dried gel or uncoagulated rubber in its properties is nearer plasticized rubber than coagulation rubber. For some purposes, the presence of the carbohydrates, etc., of the latex serum in the gel rubber is immaterial; and it is sometimes even advantageous. For most purposes, however, it would be better to have these non-caoutchouc soluble constituents of latex absent or reduced in amount. For all purposes, it is desirable to have a standardized latex and the most feasible way of preparing a material of constant and invariable composition is to remove these non-latex bodies, completely or to a substantial extent. With their removal, or with a reduction in quantity, it is practicable to obtain standardized materials of constant properties. In a prior and copending application Ser. No. 601,909, filed November 18, 1922, I have described and claimed a method of preparing a standardized and purified latex wherein latex is passed through a centrifugal machine of the general type of a cream separator wherein it is concentrated to give a standardized concentration and is, usually, washed. In the present invention latex treated in this manner is converted into gelled rubber; usually as sprayed material.

In practicing the present invention, the latex, whether it be fresh or preserved, is first concentrated in a centrifugal machine. This can be readily effected, provided precaution is taken against undue agitation; agitation producing coagulation. With any substantial amount of coagulation, the operation becomes impracticable. However, a certain amount of coalescence of the dispersed particles of the latex as it comes from the tree is desirable as facilitating centrifugal action. This is the amount of coalescence usually found in latex preserved by ammonia, and is not in any sense of the word coagulation. It is merely, so to speak, a slight coarsening of the original structure. In the centrifugal, the latex is freed of the greater part of the watery liquid containing the soluble bodies, the caoutchouc component being concentrated to a sort of cream. In the best embodiments of my invention, this cream is washed as it is produced, thereby substituting for the natural serum liquor, another liquor; this being usually a solution containing ammonia or a protective colloid. The replacement of the original mother liquor of the latex can be made complete or partial. Advantageously, in the interest of standardization, replacement is quite complete. Presuming I have washed the cream, I now have in the centrifugal an emulsion of the natural caoutchouc, with the caoutchouc in the same condition as it occurs in the original latex, but with the surrounding liquid, or continuous phase, free, or substantially free, of the natural solubles in the latex. This cream or concentrated latex, I now remove from the centrifugal under conditions precluding any violent agitation which would produce coagulation. The reduction of velocity from the centrifugal speed to zero velocity must be gradual and unattended with agitation. The cream coming from the centrifugal is collected as dried or gelled latex. To this end, I discharge the cream from the centrifugal into a drying chamber. As the liquid leaves the centrifugal, it atomizes or sprays in a finely subdivided state; and with proper regulation of conditions in the chamber, the liquid can be collected either as a dry gel or a more or less moist gel. Dried gel collects as a mass of small particles which may be used as they are for various purposes. These particles are not particles of coagulated rubber for no coagulation, that is, the formation of a reticulate structure, has occurred. They furnish an excellent rubber "solution" with benzol, carbon bisulfid, etc. Ordinarily, however, I pass the more or less moist gel particles through sheeting rolls and unite them, making a crepe or sheet of them. Creped or sheeted rubber thus produced is entirely different from crepe rubber made from coagulum, being devoid of the reticulate structure. In its properties, it is nearer analogous to milled rubbed than to plantation crepe. It is also entirely different from a gelled dry latex made without removal of the natural solubles. A dry gel containing the natural solubles gives a rubber on open cure which is quite weak as compared with the strength of ordinary milled rubber vulcanized in the same way, that is, with live steam. The tensile strength of cured plantation rubber, as compared with cured, dried, whole latex, is as high as, possibly, 10:1. Dried whole latex darkens rapidly, whereas dried purified latex is comparatively insusceptible to oxidation. Purified and concentrated latex, when gelled and dried, is uniform in character, light in color and while it is relatively slow curing, yet the rate of cure is uniform. By the use of accelerators, any desired rate of cure can be attained and this rate will be uniform; not varying from sample to sample.

While various protective colloids may be used in washing, such as sulfonated products (like soda sludge), oleates, etc., generally a trace of ammonia in the wash water is all that is necessary.

While I contemplate total, or substantially total, removal of the non-caoutchouc dissolved solids of the latex, yet when it is desired to make a material comparable to ordinary washed and sheeted coagulated plantation crepe, washing need not be carried so far; or it may be omitted by the use of another expedient which consists in primarily diluting the latex somewhat just prior to centrifugal concentration. To make an article comparable with plantation crepe, the latex may be diluted with about an equal volume of a saline solution, such as a 5 per cent solution of sodium chlorid, and then otherwise treated as previously described, save for the washing.

In the accompanying illustration, I have shown, more or less diagrammatically, certain apparatus useful in the performance of the described process. In this showing Fig. 1 is a view, mainly in central vertical section with some elements in elevation, of a complete apparatus for making gelled latex;

Fig. 2 is a partial vertical section through the apparatus of Fig. 1 at the top;

Fig. 3 is similarly a fragmental vertical section at the bottom of the apparatus; and Fig. 4 is a horizontal section through the structure of Fig. 2, the view being along line 4—4.

Referring to Fig. 1, element 1 indicates as a whole a casting and main frame for enclosing and holding rotor 2. The housing is provided with flange 3 adapted to support the entire mechanism. The rotor is driven by turbine means indicated in Fig. 1 as a whole by 4. The driving means include hollow shaft 5 supporting and actuating the rotor, the support being through collar 6 detachably secured and gasketed to the rotor proper at 7. Turbine wheel 8 is attached to and concentric with tube 5. It runs on ball race bearings 9 and 10. Around the turbine wheel is the usual casting 11 provided with means for feeding steam, etc. Element 12 is a floating annular member with concaved lower surface resting on the lower ball race and having a single ball race cut in its face. This floating intermediate member is free to rotate and to oscillate on the two sets of ball bearings. Through the turbine and through the tubular drive member 5 extend various concentric tubes for supplying liquids to the rotor.

The innermost of these tubes 13 extends downwardly to a point well below the top of the rotor. Around it is another tube 14 ending at a point near the top of the rotor with deflecting baffle means 13ª below. The latter tube is for the supply of latex and the former for the supply of washing liquid. The chamber within the rotor is unobstructed in its upper portion. At a point well below the top is the beginning of radial wings 15. As shown, these radial wings or vanes are cut away at the top and at a point lower down they extend to the axis of the machine. The shape of the vanes is so designed as to cause the upper edge of the vanes to lie along points of approximately uniform angular velocity in the latex. The upper edge, which starts at the periphery assures that all the latex below the point where the vanes join in the center shall be at the full angular velocity of the bowl without, however, stirring or causing eddies at the upper edge. Located in the lower end of pipe 13 is an axial sleeve tube 16, the upper portion surrounding the lower portion of 13. The lower end of 16 is in turn surrounded by a wider sleeve tube 17 extending down below the point at which the vanes come to the axis. At the lower end of the rotor and just below the lower end of the stated vanes, is a blocking out member 18 adapted to form flow-passages 18ª with the coned lower end of the rotor; these flow passages extending from the periphery of the rotor chamber to a point nearer the axis. At the axis is depending discharge tube 19. In the showing of Figs. 1 and 3, this discharge tube 19 extends into a drying chamber 25, wherein the concentrated latex may be dried and gelled to such an extent as may be desirable. This drying casing may be of any usual type or character and is shown provided with air inlet 26 and outlet 27. At its base it is provided with collecting means 28 which may be of any suitable character. The lower end 20 of the rotor is journaled in bearing 21 provided with drag ring 22 adapted to permit slight lateral motion of the rotor. Below the elements just described is casting 23 adapted to receive the peripheral discharge of the rotor through flow-passages 18ª. This casing is provided with outlet 24.

The main casing 1 is so shaped that should the rotor break away from its upper supporting member it will continue revolving within the casing and at the point where contact would come, the casing is strengthened by the flange 3. As shown in Fig. 1, the top of the casing is open at 29. The rotor can be removed through this opening after unscrewing the collar 6 at the top.

In the employment of the described apparatus, the rotor is started and allowed to reach its full speed. I then introduce water containing a little ammonia or a protective colloid through pipe 13; the amount of liquid so supplied being sufficient to fill the machine. As the liquid emerges from 13 into 16 it is quickly brought up to the speed of the rotor, the friction of the walls of 16 picking it up. If desired, the interior wall of 16 may be provided with vanes (not shown). Leaving tube 16, the fluid passes against the inner surface of sleeve baffle 17, passing thence to the interior periphery of the rotor. When the rotor is almost filled, the fluid emerges through the outlet port 18ª and the internal "level" of the rotating annulus is just below the edge of the central outlet port 19. I then introduce latex through the inlet pipe 14. The latex is directed across the short intervening space between the deflecting disc and the "level" of the fluid within the centrifuge. It is obvious that the body of liquor above the vanes is entrained only by the friction between it and the inner surface of the rotor, and hence the liquor at the "level" above the vanes will always move at an angular velocity much lower than that of the rotor itself; thus, the entering latex is not subjected to any violent agitation.

The vanes 15, starting at the periphery below the top, gradually increase in width and as gradually bring the whole mass of liquor within their influence up to the speed of the rotor, so that all the liquor within and below the tube 17 is at the speed of the rotor.

The velocity however of course diminishes radially inwards from the periphery to the axis. The protective colloid solution being brought to the speed of the rotor within the tube 16, it flows thence in a thin horizontal film to the surface of the latex lying between the tube 17 and the inner concentric tube 16. At this point both latex and wash solution have the same angular velocity. The tube 17 serves to localize such slight disturbance as is caused by the addition of a washing liquid at this point. The action within the centrifugal may be said to be substantially the gradual application of increasing centrifugal force to a continuous stream of latex to be treated while in a rotor of a centrifugal operating continuously at a constant speed, and the addition of a wash solution, of specific gravity lower than that of latex serum, to the latex, the wash solution having, at the time of its addition, the same angular velocity as the partially concentrated latex. The centrifugal acts not only to concentrate the latex rubber globules and permit an effective displacement of the residual serum by an ammonniacal wash water or by a protective colloid wash solution, but also to discharge it again without violent mechanical agitation in the reduction of speed from the velocity near the axis to zero velocity.

Where the latex is to be dried, a sufficient velocity is imparted to the concentrated product emerging from the centrifugal to produce a finely divided spray, susceptible of quick drying in contact with warm dry air. This drying is effected in 25. While it is ordinarily desirable that drying should be substantially complete before the sprayed particles reach the end of their fall in 25 and cohere, it is sometimes advantageous to limit the evaporation in drying to that just sufficient to produce a solid irreversible gel; subsequently completing the drying of the cohering sprayed particles in any convenient manner. In spray working, I usually pass the partially dried mass, obtained from the spray chamber, through a set of ordinary creping rolls and then either hang the resulting sheets of creped rubber to dry in suitably ventilated drying lofts, or place the sheets on the shelves of an ordinary vacuum dryer of the shelf type. Dried gel rubber obtained from latex in the manner described is rubber, but of different characteristics from that of coagulated rubber. It does not have the reticulate structure of the latter. And this gel contains materially less of the non-rubber constituents of the latex than that produced by drying untreated latex; and it may, and advantageously does, contain substantially none. In properties, the purified gel rubber of the present invention is nearer plasticized rubber than plantation crepe made from coagulated rubber.

What I claim is:—

1. The process of making rubber preparations which comprises concentrating a caoutchouc latex in a centrifugal and spraying the so-concentrated material under drying conditions.

2. The process of making rubber preparations which comprises concentrating a caoutchouc latex in a centrifugal, washing the concentrated product to remove soluble materials therefrom, and spraying the so-concentrated and washed materials under drying conditions.

3. The process of making rubber preparations which comprises concentrating a caoutchouc latex in a centrifugal and spraying the so-concentrated material under drying conditions, evaporation being carried far enough to produce a dry gel, and sheeting said dry gel.

4. The process of making rubber preparations which comprises concentrating a caoutchouc latex in a centrifugal, displacing the natural aqueous liquid in the concentrated product by water containing ammonia and spraying the so-concentrated and washed material under drying conditions.

5. As a new material, a uniform uncoagulated dried washed latex rubber, having a non-reticulate structure and being prepared by spray drying a standardized concentrated washed latex, said washed latex being relatively free of the soluble non-rubber constituents of the normal latex.

In testimony whereof, I have hereunto affixed my signature.

WILLIAM BURTON WESCOTT.